Feb. 23, 1954  L. F. GOODRICH  2,670,187
CONTAINER FILLING
Filed Sept. 12, 1950
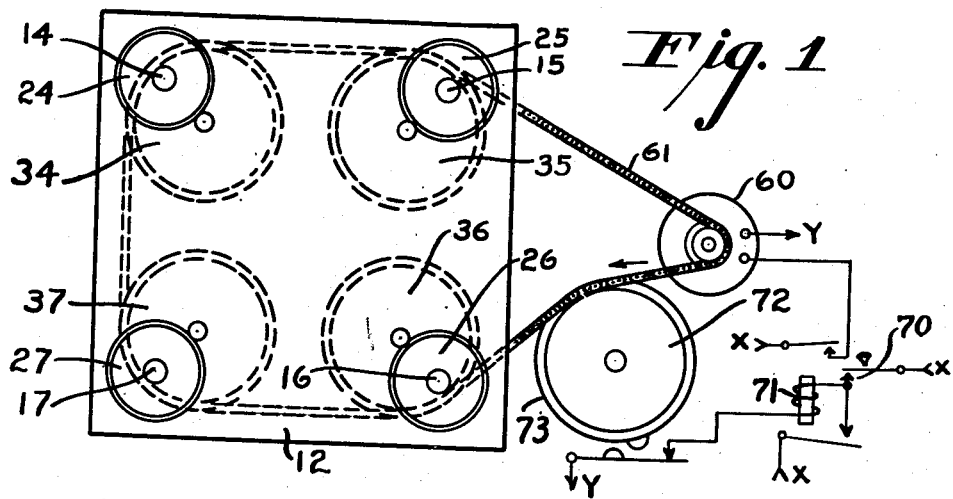
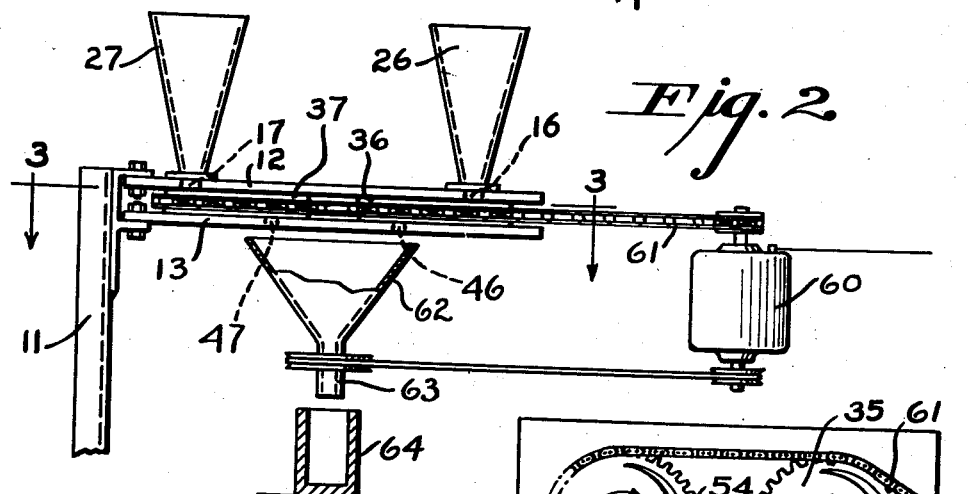
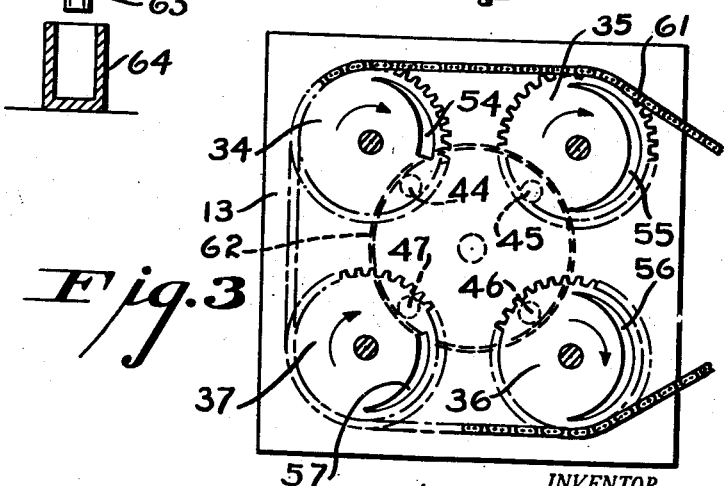
INVENTOR.
LEVI F. GOODRICH
BY
ATTORNEY Patented Feb. 23, 1954

2,670,187

UNITED STATES PATENT OFFICE 2,670,187

CONTAINER FILLING

Levi F. Goodrich, Corning, N. Y., assignor to Corning Glass Works, Corning, N. Y., a corporation of New York Application September 12, 1950, Serial No. 184,475

10 Claims. (Cl. 259—3)

This invention relates to container filling and more particularly to the filling of a mold with a plurality of different fluent materials in predetermined blends and in a predetermined order. The invention is of particular utility in the manufacture of graded seals for use as joints between glasses of widely different expansion characteristics, and by way of example is herein so applied, although it is not limited to this use.

Graded seals (and similar bodies having one or more characteristics that vary from one end of the body to the other) are customarily prepared by assembling in step-wise fashion blends of two or more powdered glasses of different expansion coefficients to provide the desired gradation in thermal expansion between the low-expansion glass and the high-expansion glass to be joined. These blends are separately prepared; the several blends are individually suitably molded one on top of another, as in an arrangement such as described in applicant's pending application Serial No. 733,232, now Patent No. 2,528,509, to provide an assembly progressively varying in thermal expansion from one end to the other; and the entire assembly fired to a vitreous state.

Seals of this type in which the thermal expansion coefficient varies continuously rather than step-wise can also be prepared by blending the individual powdered glasses or individual mixtures thereof in a suitable continuously proportioning means. So far as applicant is aware, however, such continuously varying seals have never been produced commercially. While various arrangements such as the diagonally partitioned box shown in Thomson 1,173,688 for accomplishing such continuously varying blending have been proposed heretofore, all have possessed one disadvantage or another, and none of them ever appears to have been successful in operation.

The purpose of the present invention, accordingly, is to provide a system for satisfactorily producing a graded seal or the like whereby the disadvantages of the prior proposals are overcome and their deficiencies are avoided.

In accordance with the invention, measured amounts of a plurality of different fluent powdered glasses are simultaneously blended and fed in continuously or progressively changing proportions into a mold of the shape desired for the seal to be formed. To effect continuous blending in this fashion containers are provided for the respective fluent materials, means such as movable plates or members having normally closed elongated openings of varying cross-section are provided for simultaneously withdrawing the fluent materials from their respective containers in progressively varying proportions, and provision is made for thereafter feeding such simultaneously withdrawn materials in their progressively varying proportions to the mold. The invention includes not only such method of blending fluent materials, but also the apparatus for carrying out such methods.

In the accompanying drawing Fig. 1 is a somewhat diagrammatic plan view of one form of embodiment of an apparatus in accordance with the present invention.

Fig. 2 is a view in elevation and partly in section of the apparatus of Fig. 1, but with certain parts appearing in Fig. 1 omitted for the sake of simplicity.

Fig. 3 is a view taken on line 3—3 of Fig. 2.

Referring to the drawing in detail, 11 represents a fragment of a frame supporting parallel, spaced, rectangular plates 12 and 13. Plate 12 near its respective corners has apertures 14, 15, 16, and 17 therethrough. In register with these plate apertures are the bottom outlets of fluent material hoppers of containers 24, 25, 26, and 27 respectively.

Closely fitted between plates 12 and 13 are disc sprocket wheels 34, 35, 36, and 37 whose peripheral portions, just within the confines of their teeth, pass under the respective apertures 14, 15, 16, and 17 through plate 12. In portions under wheels 34-37 diammetrically opposite the respective apertures 14-17 in plate 12, plate 13 is respectively provided with similar apertures 44-47. Wheels 34-37 are adapted to be rotated in unison about their respective axes by an associated motor 60 through a drive chain 61.

As indicated in Fig. 3, wheel 34 has an elongated passage 54 of varying cross-section therethrough, which passage is so positioned as to be progressively advanced under aperture 14 and over aperture 44 in succession as the wheel is rotated. As will be apparent, passage 54 is respectively closed at its top and bottom by plates 12 and 13 except when it is passing under aperture 14 and over aperture 44. Accordingly, passage 54 is adapted to hold a measured quantity of the material contained in hopper 24. Wheels 35-37 are respectively provided with similar elongated passages 55-57 of varying cross-section respectively similarly cooperative with apertures 15-17 in plate 12 and apertures 45-47 in plate 13.

From an inspection of Fig. 3 it will be observed that, in the present form of embodiment, passage 54, which is approximately 105° in length, starts passing over plate aperture 44 approximately 15° before passage 55, which is approximately 180° in length, starts passing over aperture 45. Passage 56, which is also approximately 180° in length, starts passing over aperture 46 as approximately half of passage 55 has passed over aperture 45, by which time passage 54 has moved clear of aperture 44. During the movement of the last half of passage 56 over aperture 46, passage 57, which is also approximately 105° in length, is passing over aperture 47. During the subsequent 15° of rotation of wheels 34–37 the remainder of passage 57 alone passes over aperture 47. A similar relationship exists, of course, between passages 54–57 and the bottom outlets of hoppers 24–27 respectively.

From the foregoing it will be appreciated that if fluent materials such as powdered glass or the like are placed in hoppers 24–27 and wheels 34–37 are rotated for one revolution, each passage 54–57 will first pass under its respective aperture in plate 12 and become filled with a measured quantity of the material in the respective hopper thereover and such measured quantities of materials will subsequently be fed through the respective apertures in plate 13 in progressively varying proportions dictated by the cross-sectional configurations of the respective passages 54–57 and their angular positions with respect to each other and their respective apertures 44–47. In the form of embodiment shown, only the material in passage 54 is discharged during the first 15° of rotation of wheels 34–37 after passage 54 in wheel 34 encounters aperture 44. During the next 90° of rotation the materials in passages 54 and 55 are simultaneously discharged at a constantly changing ratio. During the next 90° of rotation the materials in passages 55 and 56 are simultaneously discharged at a constantly changing and gradually reversing ratio. During the subsequent 90° of rotation the materials in passages 56 and 57 are simultaneously discharged at a constantly changing ratio. During the next 15° of rotation only the material in passage 57 is discharged. During the remaining 60° of rotation no material is discharged. Obviously, the selection of the variation in cross-section and of the length of passages 54–57 and their angular relationship to each other and to apertures 44–47 depend entirely on the character of the end product desired.

The materials thus fed through apertures 44–47 are preferably received by a cone 62 of a funnel having a tubulation 63 for directing the materials into a mold or cavity 64. In order to thoroughly blend the materials being fed, the funnel is preferably adapted to be rotated, as by motor 60.

For convenience sake the motor 60 may be of the internal brake type, having its circuit closed by a start relay 71 energized when a start switch 70 is closed, and having its circuit interrupted by contacts opened by a stop cam 72 driven by a sprocket wheel 73 in mesh with chain 61. In such an arrangement, by momentarily closing switch 70, a circuit is completed from an X terminal of a suitable current source through relay 71 and the contacts of cam 72 to a Y terminal of the same source. Relay 71 upon operating, at its lower contacts completes a locking circuit for itself independent of switch 70, and at its upper contacts completes the circuit of motor 60. Just before wheels 34–37 and 73 complete a revolution, cam 72 momentarily interrupts the circuit of relay 71, which accordingly restores and thus opens its own holding circuit and the circuit of motor 60.

Although applicant has illustrated an apparatus adapted to blend but four different materials, obviously the number of materials to be blended may be more or less as desired.

What is claimed is:

1. The method which comprises first separately capturing measured quantities of different fluent powdered materials from separate supply bodies thereof, and continuously combining and blending such captured materials in predetermined varying proportions while guiding them into a stationary cavity.

2. In a fluent material-feeding apparatus, a plurality of fluent-material containers each having a bottom outlet, a rotatable member arranged under each container, each such member having a generally arcuate-shaped elongated passage of varying cross-section therethrough along its length adapted to be progressively brought into and out of register with the respective container outlet by rotation of such member, means for closing the bottoms of said passages when they are in register with their container outlets, said means having apertures therethrough each adapted for progressive register with one of said elongated passages upon rotation of its respective member, and means for simultaneously rotating said members.

3. A fluent material-feeding apparatus such as defined by claim 2, wherein at least some of the rotatable members are so arranged with respect to one another and with respect to the apertures in said closing means that their respective elongated passages concomitantly pass over their respective apertures.

4. An apparatus such as defined by claim 2, wherein a funnel is arranged below said closing means with its cone under the apertures thereof, and wherein means is provided to rotate the funnel about its own axis.

5. A fluent material-feeding apparatus such as defined by claim 2, wherein the rotatable members are so arranged with respect to their respective apertures in the closing means that the passage in one member is brought into register with its aperture during a portion of a revolution and the passages in at least two members are simultaneously brought into register with their respective apertures during another portion of the revolution.

6. In a fluent material-feeding apparatus, a plurality of fluent-material containers each having a bottom outlet, a movable bottoming member under each container, each said member having an elongated passage therethrough varying in cross-section from one end to the other, means normally closing the bottoms of said passages, said means having apertures therethrough each adapted for register with one of said passages, and means to simultaneously move said members to bring their passages into concomitant and progressive register with their respective container outlets to fill such passages with material, to further move said members into bottoming relation with the container outlets and to concomitantly advance their passages progressively over the respective apertures of said means so as to progressively discharge their contents therethrough in proportions in accordance with their varying cross-sections.

7. In a fluent material-feeding apparatus, a plurality of fluent-material containers each having a bottom outlet, means for collecting the materials through the outlets of their respective containers in progressively varying proportions, and means for freeing the collected materials in the order and proportions of their collection.

8. In a cavity-charging apparatus, a fluent material-receiving plate having a plurality of apertures, means for collecting separate accumulations of a plurality of different fluent materials on said plate and for thereafter concomitantly and progressively feeding such materials in groups through the respective apertures in varying ratio relative to one another, and means for intercepting and combining such materials during their flow to the cavity.

9. The method which comprises first separately capturing measured quantities of a plurality of different fluent powdered materials from separate supply sources thereof, thereafter progressively releasing such captured materials to a fixed delivery position in predetermined varying proportions and intercepting and blending such materials while in transit to such position.

10. A method such as defined by claim 9 wherein the measured quantities of materials are captured in laterally disposed elongated cavities varying in cross-sectional area and are progressively released therefrom by progressively removing the material support from one end toward the other end of each of such cavities.

LEVI F. GOODRICH.

References Cited in the file of this patent
UNITED STATES PATENTS

| Number | Name | Date |
|---|---|---|
| 1,325,139 | Caufield | Dec. 16, 1919 |
| 1,492,271 | Snyder | Apr. 29, 1924 |
| 1,510,439 | Draver | Sept. 30, 1924 |
| 1,998,078 | Freegard | Apr. 16, 1935 |
| 2,472,092 | Campbell | June 7, 1948 |